US010466508B2

(12) United States Patent
Cano et al.

(10) Patent No.: US 10,466,508 B2
(45) Date of Patent: Nov. 5, 2019

(54) OPHTHALMIC DEVICE WITH IMPROVED AMPLITUDE VARIATION CELL

(71) Applicant: Essilor International, Charenton le Pont (FR)

(72) Inventors: Jean-Paul Cano, Charenton le Pont (FR); Jerome Ballet, Charenton le Pont (FR); David Escaich, Charenton le Pont (FR); Stephane Perrot, Charenton le Pont (FR); Claudine Biver, Charenton le Pont (FR); Fabien Berit Debat, Charenton le Pont (FR); Samuel Archambeau, Charenton le Pont (FR); Sylvie Vinsonneau, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 0 days.

(21) Appl. No.: 15/743,158

(22) PCT Filed: May 31, 2016

(86) PCT No.: PCT/FR2016/051295
§ 371 (c)(1),
(2) Date: Jan. 9, 2018

(87) PCT Pub. No.: WO2017/009535
PCT Pub. Date: Jan. 19, 2017

(65) Prior Publication Data
US 2018/0210233 A1 Jul. 26, 2018

(30) Foreign Application Priority Data
Jul. 10, 2015 (FR) ...................................... 15 56613

(51) Int. Cl.
*G02C 7/10* (2006.01)
*G02F 1/15* (2019.01)
(Continued)

(52) U.S. Cl.
CPC ............... *G02C 7/101* (2013.01); *G02B 5/23* (2013.01); *G02C 7/102* (2013.01); *G02F 1/15* (2013.01);
(Continued)

(58) Field of Classification Search
CPC .......... G02C 7/101; G02C 7/102; G02B 5/23; G02B 5/223; G02F 1/15; G02F 1/0063; G02F 1/0018; G02F 1/153
(Continued)

(56) References Cited

U.S. PATENT DOCUMENTS 3,431,327 A * 3/1969 Tsuetaki ........... B29D 11/00028
264/1.8
4,547,049 A 10/1985 Cotie
(Continued)

FOREIGN PATENT DOCUMENTS

EP  2 848 667 A1  3/2015
EP  2 848 668 A1  3/2015
(Continued)

OTHER PUBLICATIONS

International Search Report dated Sep. 21, 2016 in PCT/FR2016/051295, citing documents AA, AB and AO therein, 2pages.
(Continued)

*Primary Examiner* — Tuyen Tra
(74) *Attorney, Agent, or Firm* — Oblon, McClelland, Maier & Neustadt, L.L.P.

(57) ABSTRACT

The invention relates to an ophthalmic device including an electrically controllable amplitude variation cell, in particular an electrochromic transmission variation cell. More
(Continued)

particularly, the cell (3) comprises a main convex surface on the front. This arrangement makes it possible for the cell to process a lateral luminous flux (RP), unlike cells in the prior art (1AA).

10 Claims, 4 Drawing Sheets

(51) Int. Cl.
    *G02B 5/23* (2006.01)
    *G02F 1/153* (2006.01)
    *G02B 5/22* (2006.01)
    *G02F 1/00* (2006.01)

(52) U.S. Cl.
    CPC ............ *G02B 5/223* (2013.01); *G02F 1/0018* (2013.01); *G02F 1/0063* (2013.01); *G02F 1/153* (2013.01)

(58) Field of Classification Search
    USPC .................................. 359/265–275; 345/105
    See application file for complete search history.

(56) References Cited

U.S. PATENT DOCUMENTS

| | | |
|---|---|---|
| 5,478,824 A | 12/1995 | Burns et al. |
| 2003/0052838 A1 | 3/2003 | Kim et al. |
| 2006/0256071 A1 | 11/2006 | Kim et al. |
| 2013/0278989 A1 | 10/2013 | Lam et al. |
| 2016/0085131 A1 | 3/2016 | Lam et al. |

FOREIGN PATENT DOCUMENTS

| | | |
|---|---|---|
| EP | 2 848 669 A1 | 3/2015 |
| EP | 2 848 670 A1 | 3/2015 |
| EP | 3 115 433 A1 | 1/2017 |
| JP | 57-26822 A | 2/1982 |

OTHER PUBLICATIONS

Office Action dated Jan. 21, 2019 in European Patent Application No. 16734418.3.

* cited by examiner

OPHTHALMIC DEVICE WITH IMPROVED AMPLITUDE VARIATION CELL

The present invention relates to an ophthalmic device.

It more particularly relates to an ophthalmic device comprising at least one cell of electrically controllable variable amplitude.

It may, by way of nonlimiting example, be an electrochromic cell connected to a circuit for controlling the variation in amplitude, for example a variation in transmission in the visible spectrum.

Cells in particular of this type have (planar) front faces of zero curvature, this leading to all or some of the following drawbacks:
  a lateral light flux (of low incidence and coming from the sides of the cell), decreasing the visual comfort of the wearer of the ophthalmic device;
  a choice of cell frame restricted to cell frames of same unattractive, planar shape;
  a difficulty in respecting moreover an ophthalmic prescription of the wearer if he has one;
  generally, suboptimal cell (and device) performance.

The present invention aims to improve this situation.

It provides for this purpose an ophthalmic device comprising a cell of electrically controllable variable amplitude. In particular, said cell includes at least one transparent layer having a convex main surface front-side. This arrangement advantageously allows the visual comfort of the wearer to be increased, as described below with reference to FIGS. 3A and 3B.

In one particular embodiment in which the cell comprises at least a first transparent layer front-side and a second transparent layer back-side so that the first and second layers define therebetween a cavity, the first layer in particular has a main surface, exterior to the cavity, that is convex. In the case of a cell of variable amplitude, this arrangement allows a lateral flux RP to be treated by the cell, as illustrated in FIGS. 3A and 3B.

Provision may then be made for transparent layers of curved shapes both in the interior and of the cavity, in order to optimize in particular the properties of amplitude variation of the cavity. For example, the cavity may have a constant spacing between the first and second layers. This arrangement may for example be ensured in a tolerance range ranging up to within thirty percent (30%).

In one example embodiment, the cavity is closed and filled with an electrochromic solution, connected to a processing circuit for setting an optical amplitude of the cell. Such an arrangement, in particular with a constant spacing, allows an amplitude uniformity to be obtained in the cell.

In one embodiment, a face internal to the cavity of at least one of the transparent layers is covered with a conductive coating made of indium tin oxide. Such an arrangement allows a good performance, in particular a good transmission performance, to be obtained from the cell (in the clear state in the case of an electrochromic cell of electrically controllable variable transmission).

In one embodiment in which the cell is of electrically controllable variable transmission, the cell has a transmission in the visible spectrum:
  higher than 80% and preferably higher than 85%, in a first state, and
  lower than 30% and preferably lower than 18%, in a second state.

Of course, provision may be made for one or more intermediate states with intermediate transmission values, respectively.

These arrangements provide the wearer with visual comfort.

In one embodiment in which the cell is connected to a control circuit via a connecting element, this connecting element is of thickness smaller than 5 µm and of width smaller than 1000 µm. Such an arrangement allows a good electrical performance to be obtained from the cell.

In one embodiment in which the ophthalmic device furthermore includes a frame comprising at least one aperture housing said cell and having a convex curvature frontside, the convex main surface of said transparent layer has a curvature advantageously corresponding to the curvature of the frame. This arrangement advantageously allows the esthetics of the device to be improved, as described below with reference to FIG. 1.

Furthermore, in one embodiment, the cell includes at least one transparent layer of curvature chosen to endow the cell with an optical power respecting an ophthalmic prescription of a wearer of the device. Specifically, since the one or more transparent layers of the cell may have curved surfaces, this arrangement may furthermore be advantageous with regard to respecting a prescription of the wearer if he has one. This arrangement advantageously allows the visual comfort of the wearer to be improved.

Provision may furthermore be made for at least one transparent insert, adhesively bonded to a transparent layer of the cell and having an optical power chosen to respect an ophthalmic prescription of a wearer of the device.

The present invention also relates to a cell (as such) of an ophthalmic device of the type presented above.

Other features and advantages of the present invention will become apparent from the following detailed description, which refers to the appended drawings, in which.

Figure 2A:
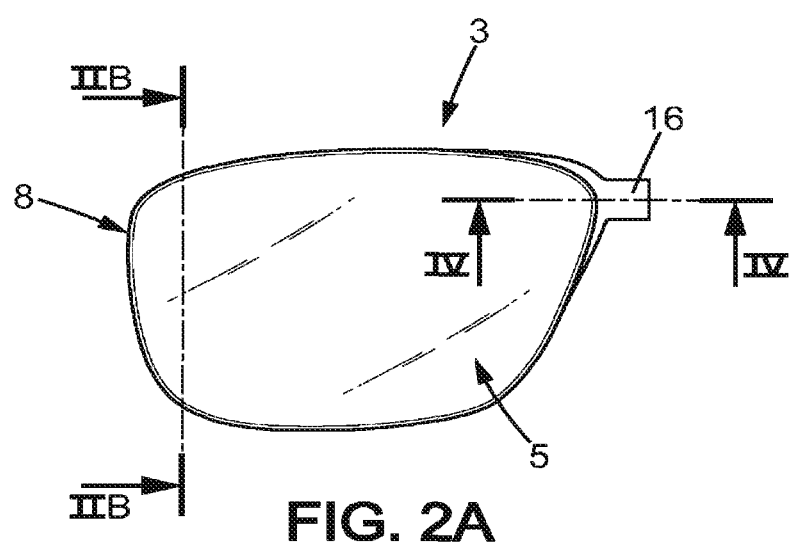
FIG. 2A is a from of an electrochromic cell from FIG. 1.
Figure 3A:
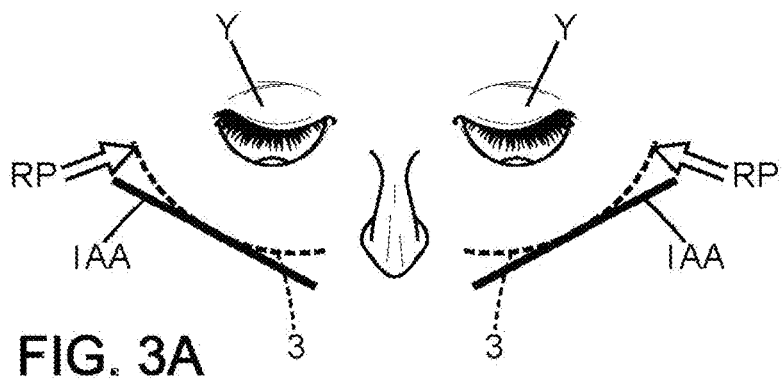
Figure 3B:
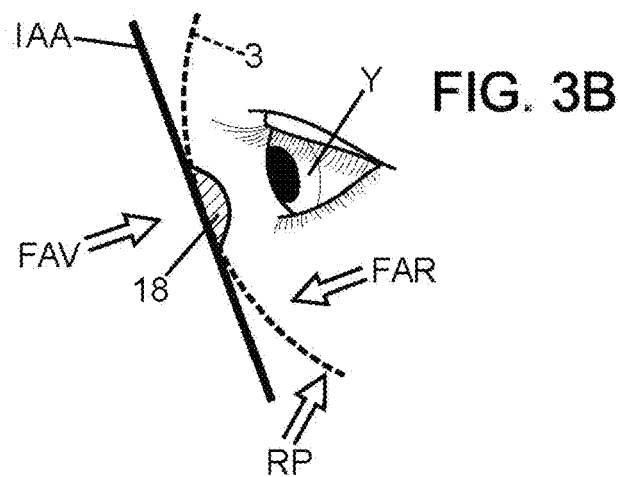
Figure 4:
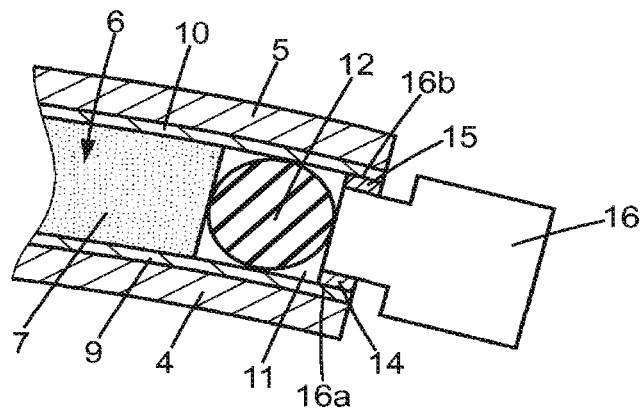
Figure 5:
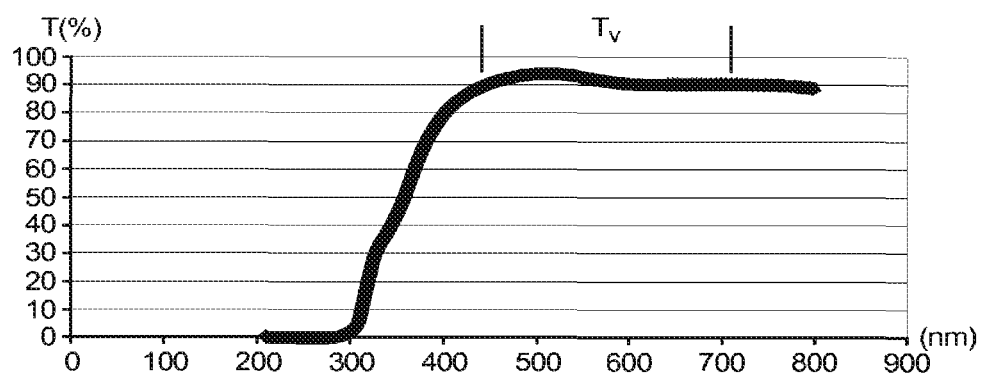
Figure 6:
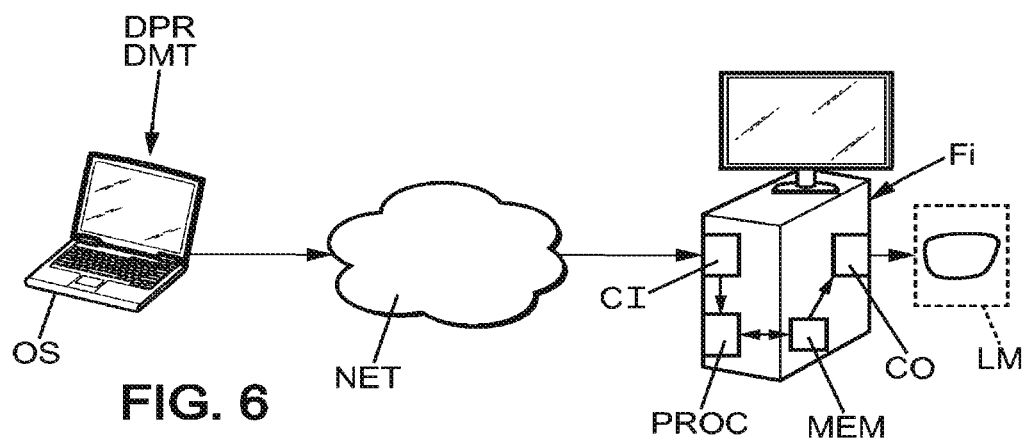
Figure 7:
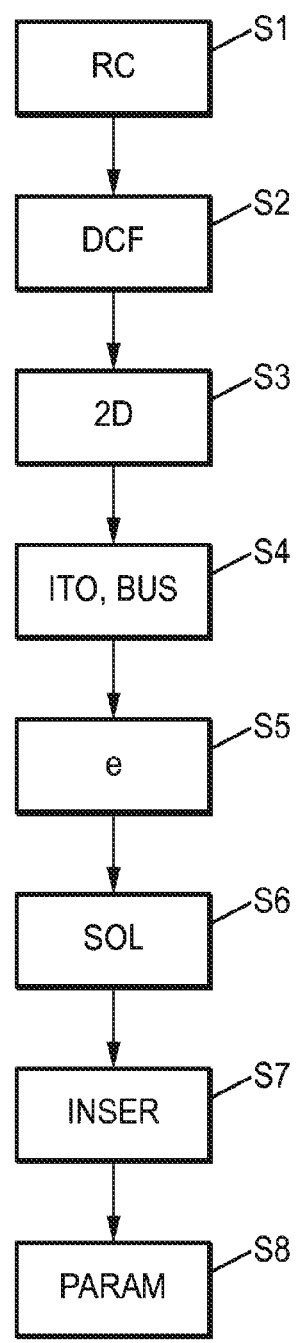

FIGS. 3A and 3B compare, respectively from in front and in profile, the optical performance of a device according to the invention, with respect to a prior-art device;

FIG. 4 is a schematic cross-sectional view in the plane IV-IV of FIG. 2A;

FIG. 5 illustrates the performance obtained in transmission with a cell of a device according to the invention;

FIG. 6 is a possible way of taking into account the prescription and the frame chosen by a wearer, in order to deliver an ophthalmic device according to the invention and taking into account these parameters;

FIG. 7 illustrates the main steps of a process for taking into account the prescription and the frame chosen by a wearer, in order to deliver an ophthalmic device according to the invention.

It should be noted that, in the figures, structural and/or functional elements common to the various embodiments may have the same references. Thus, unless otherwise mentioned, such elements have identical structural, dimensional and material properties.

For the sake of clarity, only the elements useful for understanding the embodiments described have been represented and will be described in detail.

Figure 1:
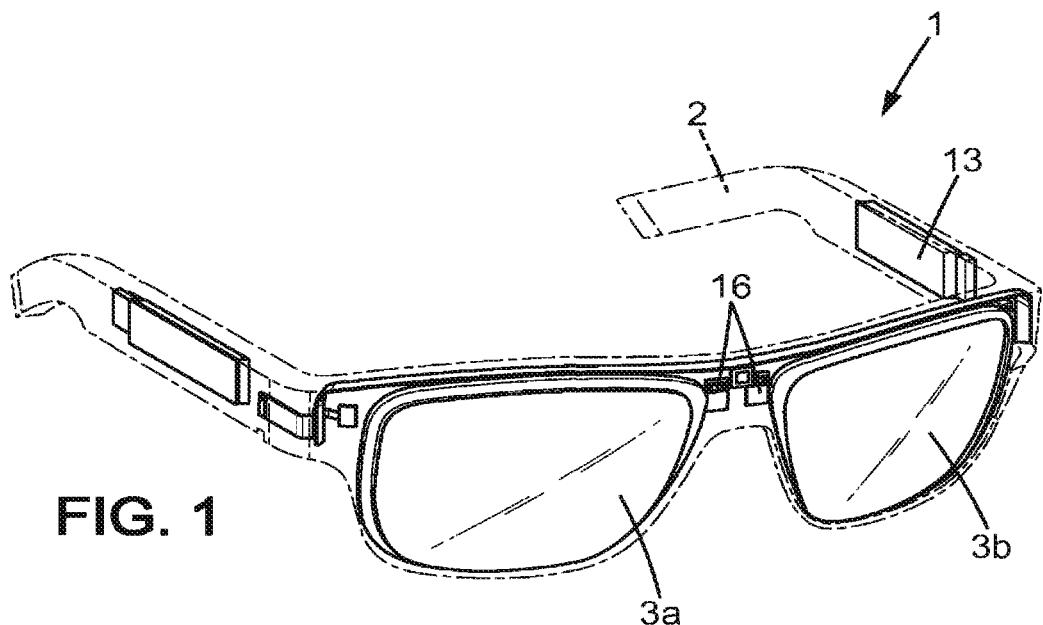
FIG. 1 is a perspective view of an ophthalmic device according to the invention.

FIG. 1 represents an ophthalmic device 1 according to the invention.

According to the embodiment shown in FIG. 1, the ophthalmic device 1 comprises a frame 2, comprising two respective housings in which two cells 3*a* and 3*b* are mounted. In the example embodiment described here, it is a question of cells of electrochromic type, connected to a circuit for controlling the variation in amplitude, for example a variation in transmission in the visible spectrum. In one variant of application, these cells may be informative eyeglasses, and therefore of electrically controllable and variable (optionally locally) amplitude. Other variants of application are also possible, in which variants cells of electrically controllable and variable amplitude are employed. Moreover, FIG. 1 shows a frame accommodating two cells, but in one possible variant the frame may accommodate only one cell and have, for this purpose, for example, a wide bridge capable of housing a single cell that extends over the entire area facing the two eyes of the wearer.

Figure 2B:
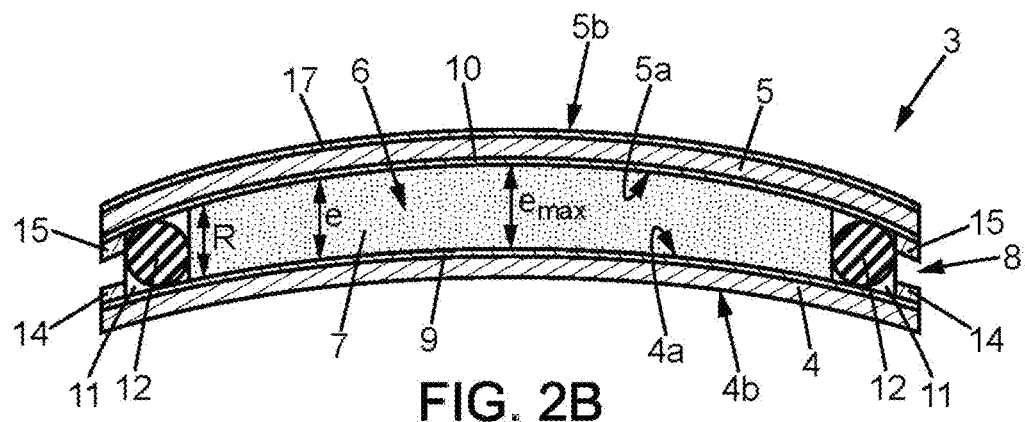
FIG. 2B is a schematic cross-sectional view in the plane IIB-IIB of FIG. 2A.

As shown in FIGS. 2A and 2B, an electrochromic cell 3 of the device 1 comprises two advantageously nonconductive transparent layers 4, 5 defining there between a cavity 6 intended to be filled with an electrochromic composition 7 in the example of application described here. Thus, each transparent layer 4, 5 comprises an inner face 4a, 5a and an outer face 4b, 5b. Thus, the term "inner" more particularly denotes the faces 4a, 5a defining the cavity 6 of the cell 3, and the term "outer" more particularly denotes the faces 4b, 5b outside the cavity 6. The inner face 4a, 5a of each of the transparent layers 4, 5 is at least partially, and preferably completely, covered by an electrically conductive coating 9, 10. The electrically conductive coating 9, 10 may for example be formed of an organic or mineral transparent conductive material, for example a transparent conductive oxide (TCO). Preferably, indium tin oxide (ITO) is used. Advantageously, such a coating offers a sheet resistance lower than 15 ohms and preferably lower than 10 ohms. With such a performance, it is possible to furthermore obtain a particularly high transmission from the cell in the "clear" state of the cell (i.e. without activating the electrochromic solution 7), with a transmission spectrum in the visible higher than 80%, and preferably higher than 85%.

The cavity 6 thus has a thickness e between the two inner faces 4a, 5a.

The transparent layers 4, 5 may be layers made of organic or mineral glass. In one embodiment, the material chosen for each layer is an optionally tempered mineral glass. The transparent layers 4, 5 may for example be spherical or cylindrical shells, and have in particular a spheroid, cylindroid or ovoid shape defined by a peripheral edge 8.

More particularly, with reference to FIGS. 3A and 3B, the cells of electrically controlled variable amplitude, of the prior art, have zero curvatures (are planar) front-side (references 1AA solid lines). It follows therefrom that a (substantially lateral) light flux RP, of low incidence, will decrease the visual comfort of the wearer (the eyes of the wearer have been referenced with the reference Y in the FIGS. 3A and 3B). Thus, the cells of the prior art are not capable of providing a sufficient protection from glare.

In contrast, a cell 3 (represented by dashed lines) at least one transparent layer of which has a convex surface front-side (and therefore a non-zero curvature) allows this additional flux RP to be filtered. It may for example be a question of filtering in transmission, for an electrochromic cell of electrically controlled and variable transmission.

It is therefore proposed here that the cell according to the invention include at least one transparent layer having a convex main surface front-side (arrow referenced FAV in FIG. 3B). By "main surface" what is meant is the large surface of the cell 3 such as it appears in FIGS. 1 and 2A. The convex layer front-side is preferably the front-side layer referenced 5 in FIGS. 1 and 2A.

Moreover, the cells of the prior art do not allow eyeglasses to be mounted in frames of all shapes, thereby limiting the choice of the wearer with respect to esthetic preferences in particular. In particular, it is not possible to mount these cells in frames having shapes the curvature of which is non-negligible, this representing the majority of frames. It is then necessary to manufacture frames of specific geometry in order to be able to accept this type of cell. In addition, the curvatures of the layers of cells of the prior art are zero, thereby generating per se an unesthetic effect.

Thus, the invention allows a wearer to be provided with an ophthalmic device, with a frame 2 and at least once cell 3, that is able to meet the needs in respect of comfort and visual performance of the wearer, and his esthetic needs.

One possible advantageous application consists in that the cell 3 is of electrochromic type, i.e. the transmission of the cell is made to vary via a redox reaction, this variation being electrically controlled. Such a cell, with a convex curvature front-side, advantageously ensures a good protection against glare, while allowing a clear state when necessary (for example under low-light conditions).

The transparent layers 4, 5 used to produce such an electrochromic cell may be glass shells of nonzero external curvature, and more particularly convex on the external front side (and for example concave on the external backside). The curvature of the front face is preferably identical or close to the curvature of the frame, and the range of curvature may vary between 0.25 D (diopters) and 11 D. It should be noted that the external front face is not necessarily of spherical curvature, but may be cylindrical inter alia, for example progressive and more generally aspherical, and therefore of locally variable curvature. It nevertheless remains of generally convex shape.

As presented above with reference to FIGS. 3A and 3B, the use of a nonzero curvature then allows the wearer to be better protected from glare when the eyeglass is in the tinted state, because the amount of light penetrating from the sides is greatly limited.

The use of a nonzero curvature also allows the electrochromic eyeglass to be fitted in frames of shapes (i.e. face-form angles) similar to what can be proposed with conventional frames, thus allowing a large choice of frames according to esthetic criteria, or criteria of protection from glare (wraparound frames). For example, a frame having a base (conventional reference for frame curvature) ranging from 2 to 8 may be used. The radii of curvature of the transparent layers corresponding to this frame curvature range may then be comprised between 60 mm and 300 mm.

Such an ophthalmic device furthermore allows the prescription of the wearer to be taken into account, as will be seen below with reference to one embodiment presented with reference to FIGS. 6 and 7.

Thus, the transparent layers 4, 5 may advantageously be ophthalmic lenses that respect, with the electrochromic composition 7 of the cavity 6, an ophthalmic prescription of a wearer of the ophthalmic device 1.

Moreover, the internal faces 4a, 5a of the transparent layers 4, 5 may be curved, i.e. they have a nonzero curvature also in the interior of the cavity. For example, the inner faces 4a, 5a of the transparent layers 4, 5 may be concave and convex, respectively. Furthermore, the external face 4b of the transparent layer 4 (on the back side FAR) may also be curved, and in particular be concave.

The cell 3, and in particular the two transparent layers 4, 5, are held together by an adhesive and more particularly a peripheral seal 11, allowing the internal faces of the layers to be kept separate. In the example shown in the figures, the seal 11 thus completely encircles the cavity 6. The seal 11 makes it possible to ensure in particular a sufficient thickness e of the cell 3, and also a lack of direct contact between the electrically conductive coatings 9, 10 of each of the transparent layers 4, 5.

The seal 11 therefore has a height h defining the thickness e of the cavity 6 in proximity to the peripheral edges 8 of the exterior layers 4, 5. This height h may be comprised between 40 microns and 200 microns, and may for example be about 100 microns. For this purpose, the seal 11 may include a spacing element 12 (having dimensions of the order of the height h) embedded in an adhesive material.

Of course, the term "width" denotes the size of an element extending in a plane substantially parallel to the inner faces 4a, 5a of the transparent layers 4, 5. The term "height" or "thickness" denotes the size of an element in a direction substantially transverse to the inner faces 4a, 5a of the transparent layers 4, 5.

The electrically conductive coatings 9, 10 of each of the transparent layers 4, 5 form electrodes which do not make direct contact with one another and are intended to be electrically connected to an external source such as a battery 13 (FIG. 1).

For this purpose, a connecting element 14, 15 (also referred to as a "bus"), in particular that is metal (made of copper or of gold for example) may be deposited at the periphery of each of the transparent layers 4, 5 in direct contact with each conductive coating 9, 10. Each of the connecting elements 14, 15 partially, or completely, encircles each transparent layer 4, 5 at its peripheral edge 8. Each of the connecting elements 14, 15 is in particular placed level with the peripheral edge 8 of each of the transparent layers 4, 5 and in particular generates an equipotential around each of the transparent layers 4, 5, which allows a uniform transmission to be obtained over the area of the eyeglass.

Each of the connecting elements 14, 15 is positioned outside of the cavity 6 formed by the cell 3 and is not therefore in contact with the electrochromic composition 7 filling the cavity 6. The seal 11 may therefore be positioned between the cavity 6 and each of the connecting elements 14, 15. In other words, the circumference of the seal 11 is smaller than the circumference of each connecting element 14, 15. Each of the connecting elements 14, 15 is thus insulated, in particular electrically, from the electrochromic composition 7, in order to prevent any local malfunction of the cell 3, and in particular in order to avoid a destructive chemical reaction of the contact of the solution with the connecting elements 14, 15.

In particular, the seal allows in this example a distance e as defined below to be maintained between the layers 4 and 5. In more generic terms, the front-side layer 5 (called the "first layer of the cell" above) includes a main surface 5a, interior to the cavity 6, that is concave. The back-side layer 4 (called the "second layer" above) includes a main surface, interior to the cavity, that is convex. More particularly, the respective main surfaces, interior to the cavity, of the first and second layers preferably have equivalent curvatures, in order to maintain a substantially constant spacing (distance e) in the cavity 6 between the first layer 5 and second layer 4. For this purpose, it is possible to accept a tolerance in the radii of curvatures of the layers such that the tolerance induced in the bow of the internal surface is substantially lower than the distance e between the layers. For example, for a radius of curvature of the internal surface of about 120 mm, a diameter of about 60 mm, and a desired distance e of about 100 µm, a radius tolerance of about 1000 µm may be acceptable, so that the tolerance in the bow is about 30 µm, the variation in the distance e between the edge of the eyeglass and its center therefore being at most equal to 30 µm. Thus a satisfactory uniformity in the thickness e is ensured over the area of the cell.

With such arrangements, the internal curvatures of the two shells 4 and 5 are similar and thus ensure a uniformity in the transmission over the entire area of the cell 6 while guaranteeing a protection from glare in all the visual field. Specifically, the thickness of electrochromic solution 7 in the cavity is substantially constant at every point on the main surface of the cell and therefore the same thus goes for the transmission properties of the cell.

In particular, such cells must allow the wearer to be provided both with an optimal protection from glare in the active state (tint with active filtering in transmission), while permitting an optimal visibility when the light flux is low (in the clear state with filtering in transmission inactive).

With reference to FIG. 5, via the arrangements described above, a cell according to the invention achieves a maximum transmission in the clear state higher than or equal to 88% in the visible spectrum Tv (at at least one point of the cell), thereby ensuring the wearer has comfortable vision when the eyeglass is in the clear state. For this purpose, the following are selected:

electrochromic molecules that are transparent in the deactivated state (for example described in documents EP2848669, EP2848667, EP2848668, EP2848670, and of application number EP15306123.9); the solution has a transmission in the deactivated state comprised between 81% and 99.5% and preferably between 95% and 99%;

a conductive deposition 9, 10 (ITO) having an attenuated transmission loss: the losses by absorption of such a deposition are advantageously comprised between 0.5 and 5%, and in practice are lower than 1%. Moreover, ITO has a low sheet resistance (typically lower than 10 ohms).

It should be noted that transmission losses may also be related to the index difference between the layers 4, 5 and the solution 7. This aspect also is taken into consideration.

Moreover, the layers (shells made of preferably transparent glass) may be coated each (or one thereof only) with one or more optically active layers. For example, an antireflection layer 17 may be deposited on the shell 5 for example on its external front face 5b as illustrated in FIG. 2B, in order to increase the transmission. Another antireflection layer (not shown) may be deposited on the back face of the second shell 4 (back-side). Thus, the losses by reflection due in particular to the ITO may be compensated for by virtue of this preferably achromatic antireflection deposition 17 on the external face of a layer or of the two layers.

In the dark state, there may be applied, with the arrangements described above, a transmission comprised between 1% and 20% and more particularly between 3 and 18%. Of course, intermediate transmission levels may be provided, and in particular, it is possible to provide a transmission variation that is continuous from the aforementioned clear state, to the aforementioned dark state, and vice versa. Moreover, in order to allow the wearer an optimal vision of colors relatively to the transmission in the dark state, it is proposed to use a formulation of at least two electrochromic molecules in the solution 7, the characteristics of which are as follows:

the redox potentials of the various molecules are very close (with a voltage difference lower than or equal to 0.1 V (preferably 0.05 V) between two oxidants, or between two reducers of the solution) so as to prevent a nonuniform coloring effect ("chameleon" effect). Specifically, if the transmission spectrum changes as a function of voltage (and therefore of the transmission), the perception of colors by the wearer is modified dynamically, and chromatic adaptation is not immediate (with an offset of a few minutes);

the formulation of the solution 7 is chosen so as to preserve natural vision. For example, the formulation is chosen so that the transmission of the cell is as close as possible to the transmission of a natural tinted eyeglass;

the cell preferably possesses in the seal an aperture on the edge face that allows the cavity to be filled with any electrochromic solution, thereby allowing the solution 7 to be adapted to compositions suited to the latest wishes of the wearer.

Regarding the electrical performance of the cell, certain arrangements are furthermore made. For example, each connecting element 14, 15 of the cell for example takes the form of a metal "bus" of thickness smaller than 5 μm (height in the context of FIG. 4), and preferably comprised between 1 and 2 microns (μm) and of width smaller than 1000 μm and preferably smaller than 750 μm. Advantageously, the longest length of such a bus has a resistance lower than 7 ohms and preferably than 3 ohms. It furthermore allows a voltage drop larger than 10 mV to be avoided. The metal from which the bus is made may be copper passivated with gold, or gold alone, or copper alone, or silver, or any other conductive metal.

In order to ensure the electrical operation of the cell 3, each connecting element 14, 15 is electrically connected to a control circuit 16. The control circuit 16 is for example a miniaturized electronic control board equipped with a microcontroller that makes it possible to control the activation of the filtering in transmission, or its deactivation, or even a transmission level of the cell 3.

According to one embodiment, as shown by way of example in FIG. 4, the control circuit 16 is placed so as to make electrical contact with the two connecting elements 14, 15. The control circuit 16 comprises for this purpose two faces 16a, 16b, each of the faces 16a, 16b being electrically connected, in particular in direct contact, with a connecting element 14, 15.

Of course, one or other or both of the transparent layers 4, 5 may furthermore bear an optically functional layer such as an antireflection layer 17 as described above, but as a variant or in addition also a polarizing layer, an antifouling topcoat, a photochromic layer, a hard coat layer (in particular protecting against abrasion, or against scratching or an impact), an antifog layer, inter alia. In particular, it may be advantageous to provide an interference or tinted layer inter alia.

In one nonlimiting example, this layer is capable of applying a filtration in the blue, in the wavelengths 430 nm to 465 nm, for the comfort and visual health of the wearer. Such layers may therefore have optical and/or mechanical properties in the ophthalmic device of the invention.

It is furthermore possible to provide at least one transparent insert (hatched portion referenced 18 in FIG. 3B) that is adhesively bonded to a transparent layer of the cell (for example the layer on the back side FAR) and that has an optical power chosen to respect an ophthalmic prescription of a wearer of the device. This insert 18 may be complemented with or consist of half-buttons in order to form a bifocal optical function, and have a generally round shape.

However, as indicated above, since the first layer 5 at least has, front-side, a nonzero curvature, it is possible to choose, at least for this layer 5 (and/or for the other layer 4 back-side), a corrective eyeglass respecting a prescription of the wearer. Thus, the cell may include at least a transparent layer (4 and/or 5), of curvature chosen to endow the cell with an optical power respecting an ophthalmic prescription of a wearer of the ophthalmic device of the invention.

Thus, in the case of a wearer having a prescription, an electrochromic cell possessing an optical power equal to that of the prescription is provided.

This prescription may be produced on the cell to be manufactured in various ways.

In a first embodiment, the layers have chosen curvatures and are produced initially to respect the prescription of the wearer.

In a second embodiment, the layers are produced initially without respecting the prescription and the optical correction required to respect the prescription is added to the active layer with an insert 18 (or "patch") that is adhesively bonded to the back face, as illustrated in FIG. 3B. The insert may, as a variant, take the form of a "wafer", and occupy all the main surface of one of the layers. Such a water is then held by the frame (suitable for holding the wafer and the cell). In She case of wafer addition, the front-side curvature of the wafer corresponds to the curvature of the back shell 4 back-side. The shapes of the respective adhesively bonded main surfaces of the shell and of the wafer are preferably identical. The use of a curved cell furthermore allows a wafer able to accommodate any prescription to be adhesively bonded. For example, for a severe myopia, a low curvature may be used, and a high curvature is instead provided for a severe hypermetropia. Alternatively, provision may be made to adhesively bond the insert front-side.

Of course, the first and second embodiments above may be complementary. Thus, it is possible to seek to manufacture a cell firstly respecting a frame curvature front-side. Next, the transparent layers are manufactured with this constraint, and with an additional constraint related to the prescription of the wearer. Provision may be made, as a last resort, in the case of a practical difficulty in producing the complete cell with these two constraints, to furthermore add an insert in order to definitively respect the prescription of the wearer.

Thus, in more generic terms, in an ophthalmic device 1 of the type show in FIG. 1, and therefore including a frame 2 in particular having a convex curvature front-side, the first constraint will be, according to an advantageous feature proposed here, that the front-side convex surfaces of the cells 3a, 3b housed in the frame have a curvature corresponding to the curvature of the frame 2.

Specifically, since the present invention provides a cell having a convex transparent layer front-side (in particular to avoid a light flux from the sides), the invention advantageously allows a correspondence to be ensured between, on the one hand, the (generally convex) front-side curvature of a frame intended to house the cell and, on the other hand, the curvature of the convex layer of the cell front-side.

Thus, the present invention also relates to a process for manufacturing an ophthalmic device including a (for example electrochromic) cell comprising at least two transparent layers defining therebetween a closed cavity (for example filled with an electrochromic solution connected to a processing unit for setting an amplitude of the cell), wherein:

at least data on the shape of a frame intended to house said cell are received;

manufacturing parameters of the cell are determined at least depending on said frame-shape data; and said cell is manufactured depending on said parameters.

The process according to this embodiment is particularly advantageous, in particular as such, and may, where appropriate, be the subject of separate protection.

In one possible embodiment of such a process, the frame-shape data include at least data on the area for housing the ophthalmic device in the frame.

In addition or as a variant, the frame-shape data include at least data on the curvature of a housing of the ophthalmic device in the frame.

In this embodiment, it is possible to determine, depending on said curvature-shape data of the frame, corresponding curvature parameters of at least one of the transparent layers.

The process may include steps in which:
a) in addition to the frame-shape data, ophthalmic-prescription data of a wearer of the ophthalmic device are received;
b) depending on the one hand on said frame-shape data and on the other hand on the ophthalmic-prescription data, curvature data of at least one of the transparent layers are determined; and
c) transparent layers respecting, with the electrochromic composition of the cavity, the ophthalmic prescription of the wearer are selected, at least one of the layers having the curvature data determined in step b).

In this embodiment, it is possible to adhesively bond a transparent insert having a chosen optical power, to at least one of the transparent layers, in order to respect the ophthalmic prescription of the wearer.

In one embodiment, it is possible to determine, furthermore among the parameters of the cell, at least one electrochromic-solution composition, in order to control a phase transition speed of the electrochromic solution over die area of the cell, and thus, a tint uniformity over the area of the cell.

In one embodiment, the frame-shape data include at least data on the shape of a bezel of the frame, and it is then possible to determine, depending on said bezel-shape data, geometrical parameters of the outline of the cell, which allow die cell to be correctly fitted into the bezel of the frame. For example, the cell may possess a seal having a bezel shape able to closely follow the shape of the bezel of the frame.

In one embodiment, in addition to the frame-shape data, desired data from at least the following data are received:
values of amplitudes of the cell;
speed of variation in amplitude of the cell;
battery life;
tint of the cell;
tint uniformity;
and parameters of the cell for the manufacture of the ophthalmic device are determined at least depending on said frame-shape data and said desired data.

In one embodiment:
parameters of the cell are determined at least depending on said frame-shape data, said parameters being at least:
a type of battery in response to an electrical consumption of said cell, estimated depending on said frame-shape data;
data on the shape of the transparent layers;
data on the curvature of at least one of the transparent layers;
data on surface treatments to be given to the transparent layers;
electrochromic solution composition;
data on the spacing between the two transparent layers;
data for parameterizing the processing unit for controlling a preset amplification of the cell;
a type of processing unit and of connection for a link to the electrochromic solution in response to a predicted bulk of the processing unit and of the connections in the cell; and
said parameters of the cell are applied for the manufacture of the ophthalmic device.

In one possible embodiment, a computational unit including at least one processor determines said parameters of the cell depending on at least said frame-shape data. Thus, the present invention also envisages a computer program comprising instructions for the implementation of the method hereinabove, when this program is executed by a processor (in particular a processor of the aforementioned computational unit).

The present invention therefore also relates to a data processing device, including a computational unit of the aforementioned type, and including at least one processor for determining said parameters of the cell depending on at least said frame-shape data, for the implementation of the above method. Such a device may furthermore include a communication interface for receiving at least said frame-shape data via a communication network, and an output interface for delivering control setpoints for an apparatus for manufacturing ophthalmic devices depending on said parameters of the cell.

Thus, a process for manufacturing electrochromic cells for incorporation into an electrochromic frame allowing the needs of the wearer in terms of performance, visual comfort and esthetics to be best met is furthermore proposed above.

FIG. 6 illustrates an example of a system capable of implementing this process.

A computer OS (tablet, smartphone, PC, inter alia) connected to an ordering site obtains frame data DMT (and optionally prescription data DPR of the wearer) and orders the production of the ophthalmic device including an electrochromic cell (or pair of cells) depending on the needs of the wearer. It may be a question of a computer of the optician, of a frame manufacturer, of an online site for frame configuration that the user accesses directly, in particular.

The computer OS may then send via the network NET the desired characteristics of the cell, at least one from the following list:
an eyeglass shape for the cell (for example a 2-D shape via files of points for example, this shape corresponding to the shape of the frame intended to incorporate the cell);
the curvature (in diopters for example) of the eyeglasses (these points are transferable via a 3-D file), the eyeglass shape and the curvature then being adapted to the frame data intended to accommodate the cell;
the desired transmission characteristics (ranges of transmission values in the clear state and in the dark state, respectively, for example);
the tint of the cell: it may for example be a question of a reference tint preset by a finite set of proposed tints. It may also be a question of a tint from a set of tints achievable by combining proposed electrochromic molecules (providing a continuous tint variation);
the general collection of the cell depending on the prescription of the wearer, and the position of points that are important to achieve this (optical center in particular);
a desired speed of transition between the clear state and the dark state and vice versa;
a desired battery life.

A device FI for implementing the process described above is equipped with a communication interface CI for receiving these data via the network NET, and with a processing circuit incorporating a processor PROC and a memory MEM (this memory being used as a working memory but also to store data, in particular the instructions of the aforementioned computer program). This processing circuit is therefore integrated into a computational unit for estimating parameters of the cell to be manufactured depending on data received by the network. It furthermore includes an output interface CO for delivering control setpoints for an apparatus LM for manufacturing ophthalmic devices depending on the estimated parameters of the cell.

The device FI may therefore be on a site for designing the electrochromic cell. The manufacturing apparatus LM (for "Lens Manufacturer") produces the electrochromic cells and is located on a manufacturing site (which may be the same site or a different site from that on which the device FI is located).

The device FI then calculates all of the parameters of the cell, then allowing the apparatus LM to manufacture this cell in the steps shown in FIG. 7:

S1: selecting glass shells having the estimated radii of curvature depending in particular on the curvature of the frame and optionally on the prescription of the wearer;

S2: carrying out surface processing on the shells in order to deposit an optically functional layer (antireflection, filtering the blue and violet, providing a gradient, providing a tint, inter alia) for example estimated depending on the desired transmission characteristics;

S3: cutting the shells depending on the 2-D shape of the frame housings (the 3-D bezel data of the housings of the frame being included therein with regard to machining the eyeglass edges);

S4: carrying out surface processing in order to deposit the electrically conductive coatings 9, 10 connecting a peripheral bus 14, 15 (for example made of copper) and linking to a daughterboard for amplitude control of and more generally communication with the electrochromic cell, the choice of the material of the electrically conductive coatings 9, 10 (ITO for example) possibly being dependent on the battery life and/or the desired transmission characteristics;

S5: sealing the two shells and respective connections while in particular making provision for a distance e between the two shells depending on the desired transmission: a larger distance implies a lower transmission, all else being equal. Moreover, the distance e may also be determined depending on the desired consumption (a larger distance e decreasing consumption);

S6: determining the formulation of the solution 7 depending on the desired tint of the cell, on the desired transmission value in the dark state, on the desired consumption and on the desired transition speed:

the relative proportion of each type of electrochromic molecule allowing the desired tint (color) to be obtained is determined, the concentration may be determined depending on the desired maximum transmission (a higher concentration for a lower transmission) or depending on the desired consumption (a higher concentration implying a higher consumption) or depending on the desired transition speed, it is also possible to determine the solvent depending on the desired transmission, consumption and or speed: a solvent that slows the migration of the species may be chosen in order to decrease the transmission, or to decrease the consumption, or to decrease the speed of response.

The power source 13 to be provided is also an important parameter to take into account. Specifically, the shape of the frame (generally, its area and/or its curvature) in particular influences the area of the corresponding cell, and thus, the power supply required to obtain an amplitude variation over all of this area. Furthermore, the phase-transition speed and its uniformity may also depend on the delivered supply.

S7: after the cavity has been filled with the estimated formulation via an aperture located in the edge face of the cell, adhesive bonding an insert (if a correction is desired according to the prescription data DPR) for example the wafer having the shape allowing an optical correction corresponding to the prescription of the wearer and having an optical center correctly positioned with respect to the shape of the cell, this wafer then being added, by coupling (by adhesive bonding or mechanical mounting via the edges, or coupling with a gel), back-side of the cell or front-side;

S8: parameterizing the control daughterboard, with:

the settings for the transmission/tint/shape/transmission-speed functions:

control voltages compatible with the cell may be parameterized (taking into account the potential differences of the oxidants and reducers used), the rate of change in voltage may be parameterized to accelerate/decrease the transition speed;

storage of information relating to the eyeglass:

information relating to the transmission/tint/curvature/shape (3-D file for example)/area of the eyeglass/correction/solution thickness/viscosity/maximum and minimum voltage/connections used/physical characteristics of the shells, of the battery (these data for example possibly being read via an integrator of the cell in order to identify its characteristics);

the daughterboard may also be used to store, once integrated, statistics on the use of the cell.

The electrochromic cell thus produced may then be sent to a site for integrating file cell into the frame and a motherboard connected to the various daughter boards and peripheral elements (one or more light sensors in the frame for controlling the dark or clear state, or other elements).

The invention claimed is:

1. An ophthalmic device comprising:
a cell of electrically controllable variable amplitude, the cell comprising at least a first transparent layer front-side and a second transparent layer back-side, the first and second layers defining therebetween a cavity, the first transparent layer having a main surface, exterior to the cavity, that is convex,
wherein the ophthalmic device includes at least one transparent insert, adhesively bonded to the first and/or second transparent layers of the cell and has an optical power chosen according to an ophthalmic prescription of a wearer of the device.

2. The device as claimed in claim 1, wherein the cavity has, to within 30%, a constant spacing between said first and second layers.

3. The device as claimed in claim 1, wherein the cavity is closed and filled with an electrochromic solution, connected to a processing circuit for setting an optical amplitude of the cell.

4. The device as claimed in claim 1, wherein a face internal to the cavity of at least one of the transparent layers is covered with a conductive coating made of indium tin oxide.

5. The device as claimed in claim 1, wherein the cell is of electrically controllable variable transmission in order to be, in the visible spectrum:
   higher than 80% in a first state, and
   lower than 30% in a second state.

6. The device as claimed in claim 5, wherein the cell is of electrically controllable variable transmission in order to be, in the visible spectrum:
   higher than the 85%, in the first state.

7. The device as claimed in claim 5, wherein the cell is of electrically controllable variable transmission in order to be, in the visible spectrum:
   lower than 18%, in the second state.

8. The device as claimed in claim 1, wherein the cell is connected to a control circuit via a connecting element of thickness smaller than 5 µm and of width smaller than 1000 µm.

9. The device as claimed in claim 1, furthermore including a frame comprising at least one aperture housing said cell and having a convex curvature front-side, wherein the convex main surface of said transparent layer has a curvature corresponding to the curvature of the frame.

10. The device as claimed in claim 1, wherein the cell includes at least one transparent layer of curvature chosen to endow the cell with an optical power respecting an ophthalmic prescription of a wearer of the device.

\* \* \* \* \*